Aug. 12, 1969

A. J. COLAUTTI 3,460,794

SEAT ADJUSTER

Filed June 14, 1967

INVENTOR.
Albert J. Colautti
BY
E. J. Bishop
ATTORNEY

Aug. 12, 1969 A. J. COLAUTTI 3,460,794
SEAT ADJUSTER
Filed June 14, 1967 2 Sheets-Sheet 2
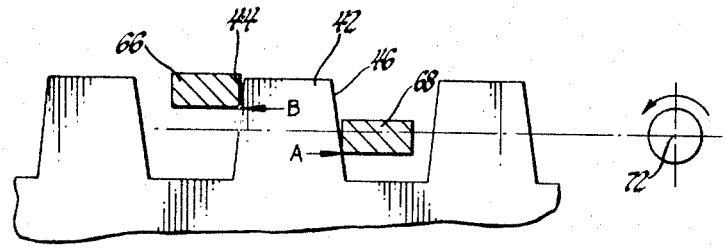
Fig. 3
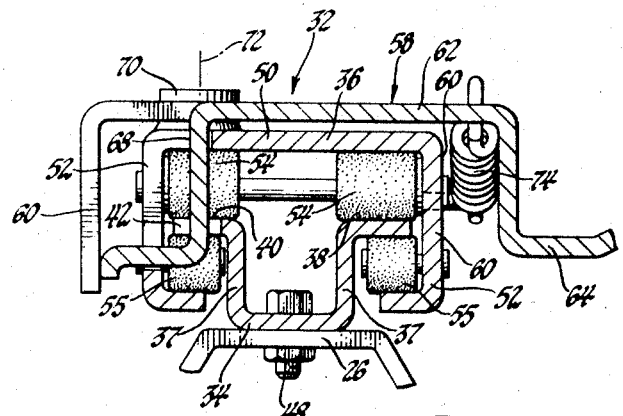
Fig. 4
Fig. 5
INVENTOR.
Albert J. Colautti
BY
C. J. Bishup
ATTORNEY //  # United States Patent Office 3,460,794
Patented Aug. 12, 1969

3,460,794
SEAT ADJUSTER
Albert J. Colautti, Windsor, Ontario, Canada, assignor to General Motors Corporation, Detroit, Mich., a corporation of Delaware
Filed June 14, 1967, Ser. No. 645,964
Int. Cl. F16m *13/00*
U.S. Cl. 248—430                                5 Claims

ABSTRACT OF THE DISCLOSURE

A seat adjuster mechanism using a telescoping slide structure wherein a latch bar, pivotally connected to the movable upper slide member, has locking bars that are selectively engageable with rack teeth formed on the lower stationary slide member. The latch bar is spring biased toward a locked position wherein one of the locking bars engages the rear side of a rack tooth at a point forwardly and inwardly of the latch bar pivot axis and the other locking bar engages the front side of the rack tooth at a point outwardly and forwardly of the aforesaid pivot axis so that fore-and-aft loading of the seating structure produces a camming action that tends to force the locking bars inwardly into positive engagement with the rack tooth.

---

Certain latching mechanisms for seat adjusters employ a manually operated latch that is pivotally connected to an upper movable seat supporting slide member. The latch has a tongue portion that is received within the groove formed by the inwardly diverging side walls of rack teeth formed on a lower stationary member and serves to engage the sides of the adjacent teeth to selectively lock the seat against relative horizontal movement. The latch is normally spring biased toward the latched position and under fore-and-aft loading conditions, there is a possibility that the inwardly diverging walls of the rack teeth will act as a wedge against the tongue. Under extreme conditions, the wedging action may be sufficient to overcome the spring biasing and permit the latch bar to pivot to an unlocked position.

The seat adjuster latch mechanism made in accordance with the present invention positively engages the rack teeth under fore-and-aft loading conditions. A conventional seat supporting upper slide member is slidably and telescopically supported by a stationary lower slide member having a rack portion formed along a portion of its inboard edge. A latch mechanism is pivotally connected to the upper slide for rotation about a vertical axis located above the rack portion. Two laterally spaced locking bars are formed on the latch mechanism, one of which is adapted to engage the front side of a rack tooth at a point outwardly and forwardly of the pivotal connection while the other lock bar is adapted to engage the rear side of the tooth at a point forwardly and inwardly of the pivotal connection. By this positioning of the locking bars, a camming effect is developed at the pivotal connection that tends to rotate the latch bar inwardly under fore-and-aft loading conditions thereby providing a positive engaging force additive to the normal engagement force established by a tensioned coiled spring.

Accordingly, the objects of the present invention are: to provide a latch mechanism for a vehicle seat adjuster that is in positive locking engagement during periods of fore-and-aft seat loading; to provide a latch mechanism for an adjustable vehicle seat slide structure wherein locking bars engage opposite sides of a rack tooth and each is positioned such that a positive engaging force is developed under fore-and-aft loading of the seat structure; and to provide a seat adjusting mechanism for a seat supporting slide structure wherein a latch bar, attached to a movable seat supporting slide member for pivotal movement about a vertical axis at a point above a rack portion formed on the stationary lower slide member, has a first latch bar that engages the rear side of a rack tooth forwardly and inwardly of the axis and a second latch bar that engages the front side of the rack tooth forwardly and outwardly of the axis whereby fore-and-aft loading of seating structure causes an inward camming action that positively engages the lock bars with the rack tooth.

These and other objects of the present invention will become apparent to one skilled in the art upon reading the following detailed description, reference being made to the accompanying drawings in which:

FIGURE 3 is a schematic of the forces on the latching mechanism during fore-and-aft loading of the seating structure;

FIGURE 4 is a view taken along line 4—4 in FIGURE 2; and

FIGURE 5 is a perspective view of the latching mechanism of FIGURE 1.

Figure 1:
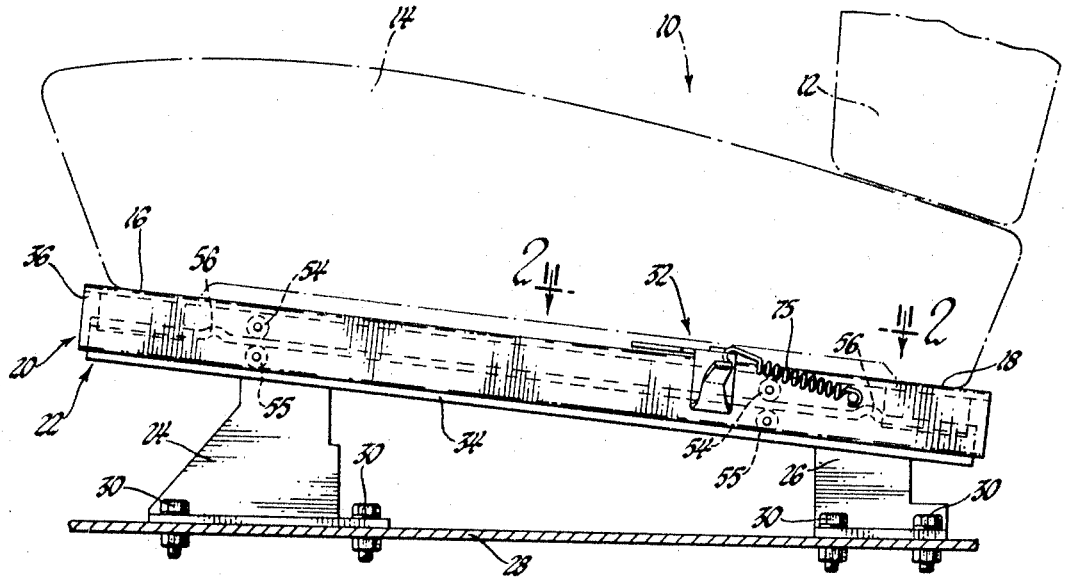
FIGURE 1 is a side view of a seating structure incorporating the seat adjuster made in accordance with the present invention.

Referring now to FIGURE 1, a conventional vehicle seating unit 10, including seat back 12 and seating cushion 14, is fixedly secured by means of studs, not shown, at points 16 and 18 to an adjustable supporting structure 20. The adjustable supporting structure 20 comprises a pair of horizontally aligned, laterally spaced slide assemblies 22, fixedly secured at the front by mounting brackets 24 and at the rear by mounting brackets 26. The mounting brackets 24 and 26 are, in turn, attached to the vehicle floor 28 by means of bolts 30. Additionally, the slide assembly 22 adjacent the driver's side of the vehicle includes a latching mechanism 32 to be described in detail below. The slide assemblies 22 may be interconnected by one or more stabilizer bars, not shown, to prevent the seating cushion 14 from becoming cocked. In the preferred embodiment, a latching mechanism 32, is used only on the slide assembly 22 adjacent the driver. However, it should be understood that a similar latching mechanism could be incorporated on the other slide assembly and, by appropriate interconnection, movement of one mechanism will cause a corresponding movement in the other. As the invention is directly related to the latching mechanism 32, the remaining description will proceed with reference only to the adjustable supporting structure 20 on the driver's side.

Figure 2:
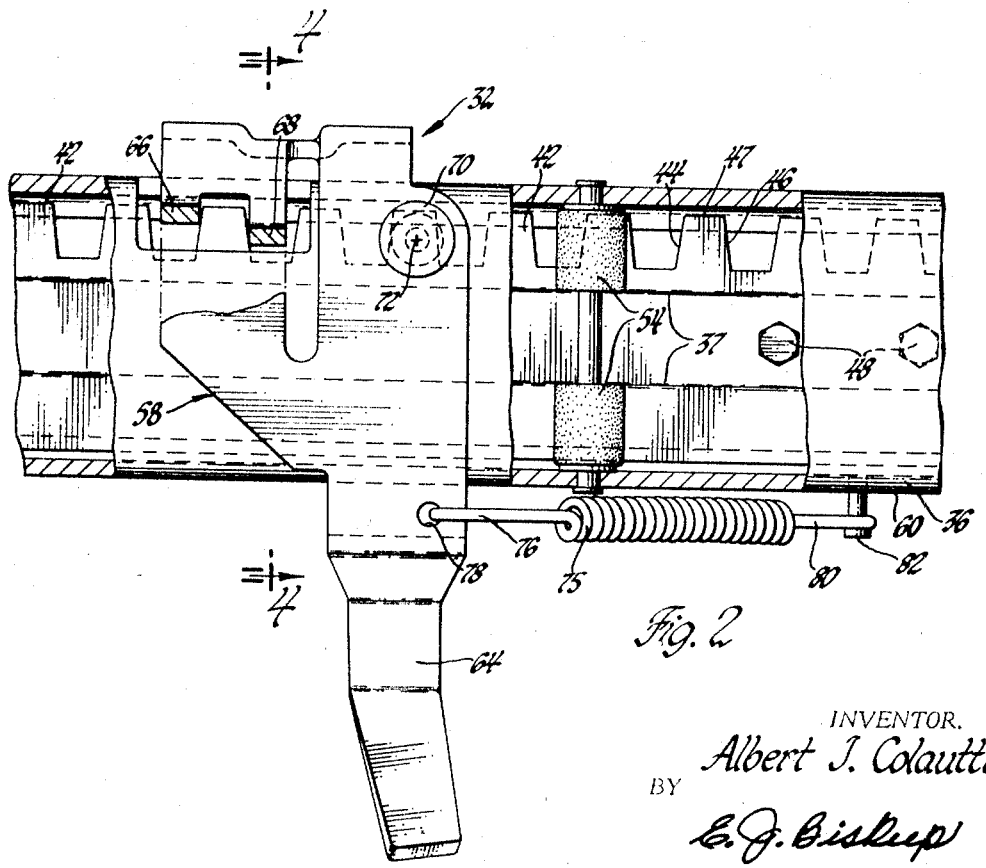
FIGURE 2 is a view taken along line 2—2 of FIGURE 1.

The slide assembly 22, in general, includes an elongated stationary horizontal lower slide member 34 that slidably and telescopically supports an elongated movable upper slide member 36, in a manner that is well known in the art. As shown in FIGURES 4 and 5, the lower slide member 34 is a generally U-shaped channel having its side walls 37 terminating in outwardly turned horizontal flanges 38 and 40. A plurality of rack teeth 42 are formed along a portion of flange 40, each tooth having spaced inwardly diverging sides 44 and 46 interconnected by a tip portion 47. The number of these teeth 42 and spacing thereof corresponds to the desired range of adjusting movement and desired number of adjustment positions. As shown in FIGURES 2 and 4, member 34 is fixedly mounted on the support brackets 24 and 26 by means of bolts 48.

The upper slide 36 is a generally inverted U-shaped channel having a horizontal base 50 and downwardly extending side walls 52 that are laterally spaced from the side walls 37 of the lower slide member 34. The upper slide 36 is slidably telescopically supported on the upper surfaces of the flanges 40 and 38 of the lower slide member 34 by means of antifriction bearings 54 journalled within the upper slides 36 and located at the front and rear sections thereof while lower bearings 55, rotatably connected to the side walls 52 below bearings 54, engage the lower surfaces of the flanges 38 and 40 to prevent relative vertical movement of the slides. Detents 56, formed on the flanges 38 and 40, engage the bearings 54 to limit the range of sliding movement.

As shown in FIGURES 4 and 5, the latching mechanism 32 comprises a generally U-shaped latch bar 58 having downwardly extending side walls 60 laterally spaced from the side walls 52 of the upper slide 36. The side walls 60 are interconnected by a top plate 62 and an outwardly extending operating handle 64 is integrally formed with one of the side walls. Located forwardly of the inward wall 60 and integrally connected to the same and the top plate 62 are laterally spaced vertically extending locking bars 66 and 68. The latch bar 58 is pivotally connected by pin 70 to the top plate 62 at a point laterally corresponding to the horizontal center line of the rack teeth 42 so that the lock bar 58 is rotatable about a vertical axis 72. A notch 74, formed in the inward side wall 52 and base 50 of the slide 36, permits engagement of the teeth 42 by the lock bars 66 and 68. The locking bars 66 and 68 are laterally and horizontally spaced so that the rear face of the locking bar 66 engages tooth side 44 at a point forwardly and outwardly of the vertical axis 72 while the front face of the locking bar 68 engages tooth side 46 at a point forwardly and inwardly of the axis 72. This normally latched position of the slide assembly 22 is maintained by a coiled spring 75 having one end 76 hooked through an aperture 78 formed in the top plate 62 and the other end 80 connected to a pin 82 that is spot welded to the outer side wall 60 of the upper slide 36. The spring 75 is tensioned sufficiently to retain the latching mechanism 32 in a locked position until the operating handle 64 is moved forwardly thereby disengaging the locking bars 66 and 68 from the tooth 42 and permitting horizontal sliding movement of the seating unit 10 relative to the floor 28.

The above described latching mechanism 32 provides for positive engagement of the teeth 42 by the lock bars during at-rest conditions as well as periods of fore-and-aft loading. As shown in FIGURE 3, if a forward force B is applied to the locking bar 58, a counter-clockwise force, additive to the biasing force of the spring 75, is applied about axis 72 and tends to cam both locking bars inwardly along the sides of the tooth 42. A rearward force A, applied to lock bar 60, causes a similar counter-clockwise camming action at the vertical axis 72. Thus, for both fore-and-aft loading conditions of the seating structure, the latching mechanism 32 positively engages the slide member 34 to restrict horizontal movement of the seating unit until the locking bars are manually disengaged from the sides of the tooth.

Since other changes and modifications will be obvious to one skilled in the art, the invention, as defined in the appended claims, is intended to cover such alterations of the described embodiment.

What is claimed is:
1. In combination with a seat structure, a seat adjusting mechanism comprising an elongated stationary horizontal lower slide member having a plurality of rack teeth equally spaced along the longitudinal length thereof, means for fixedly mounting the lower slide member on a floor support, an elongated movable horizontal upper slide member slidably and telescopically supported by the lower slide member, a latch bar pivotally connected to the upper slide member for rotation about an axis substantially normal to the plane of said rack teeth, said axis passing through the longitudinal center line of the rack teeth, a pair of locking bars on said latch bar, said locking bars adapted to engage the opposite sides of a rack tooth in a locked position and being located in positions so when in said locked position one of the locking bars engages the side of the rack tooth nearest the axis and to one side of said longitudinal center line and the other of the locking bars engages the side of the rack tooth outwardly of the axis at the other side of said longitudinal center line whereby fore and aft loading of the seating structure causes a camming action that positively engages the lock bars with the rack tooth, and spring means biasing the lock bar to the locked position.

2. The invention as recited in claim 1 wherein the rack teeth have inwardly diverging sides.

3. The invention as recited in claim 1 wherein the upper slide member is slidable between detent positions.

4. A seat adjusting mechanism comprising an elongated stationary horizontal lower slide member having a rack portion located in a substantially horizontal plane and including a plurality of inwardly diverging rack teeth extending outwardly from and equally spaced along the longitudinal length thereof, support brackets fixedly connecting the lower slide member to a floor support, an elongated movable horizontal upper slide member slidably and telescopically supported by the lower slide member for relative horizontal movement, a seating unit including a seating cushion and seat back fixedly mounted on the upper slide member, detents formed on the lower slide member and adapted to engage the upper slide member to limit relative movement therebetween, a latch bar including an outwardly extending operating handle pivotally connected to the upper slide member for rotation about a substantially vertical axis located above the rack teeth and passing through the longitudinal center line of the rack teeth, a pair of locking bars formed integrally with the latch bar, said locking bars adapted to engage the front and rear sides of a rack tooth in a locked position and being located in laterally spaced planes so when in said locked position one of the locking bars engages the front side of the rack tooth and to one side of said longitudinal center line and the other of the locking bars engages the rear side of the rack tooth at the other side of said longitudinal center line whereby fore and aft loading of the seating unit causes a camming action that positively engages the lock bars with the rack tooth, and a tensioned spring biasing the lock bar to the locked position.

5. The invention as recited in Claim 4 wherein a notch is formed in the upper slide member adjacent the rack teeth and the locking bars are rotatable therethrough between the locked position and an unlocked position.

References Cited
UNITED STATES PATENTS

| | | | |
|---|---|---|---|
| 3,279,737 | 10/1966 | Krause | 248—430 |
| 3,288,422 | 11/1966 | Krause | 248—429 |
| 3,350,046 | 10/1967 | Kirk | 248—430 |

FRANCIS K. ZUGEL, Primary Examiner

U.S. Cl X.R.

248—420, 423